United States Patent [19]

Kanazawa et al.

[11] Patent Number: 4,572,316

[45] Date of Patent: Feb. 25, 1986

[54] FOUR-WHEEL STEERING SYSTEM FOR VEHICLE

[75] Inventors: Hirotaka Kanazawa; Takatani Teruhiko; Furutani Shigeki, all of Hiroshima; Isamu Chikuma, Gumma; Satoru Shimada, Gumma; Hiroshi Eda, Gumma, all of Japan

[73] Assignee: Mazda Motor Corporation, Hiroshima, Japan

[21] Appl. No.: 709,723

[22] Filed: Mar. 8, 1985

[30] Foreign Application Priority Data

Mar. 15, 1984 [JP] Japan .................................. 59-48053
Mar. 15, 1984 [JP] Japan .................................. 59-48054

[51] Int. Cl.[4] .............................................. B62D 5/06
[52] U.S. Cl. .................................. 180/143; 180/234; 280/91
[58] Field of Search ............... 180/140, 141, 142, 143, 180/148, 155, 79.1, 234; 280/91

[56] References Cited

U.S. PATENT DOCUMENTS

| | | | |
|---|---|---|---|
| 3,596,730 | 8/1971 | Cecce | 280/91 |
| 4,105,086 | 8/1978 | Ishii | 180/143 |
| 4,313,514 | 2/1982 | Furukawa | 180/143 |
| 4,440,254 | 4/1984 | Shibahata | 180/140 |
| 4,467,885 | 8/1984 | Furukawa | 280/91 |

Primary Examiner—Joseph F. Peters, Jr.
Assistant Examiner—Everett G. Diederiks, Jr.
Attorney, Agent, or Firm—Murray, Whisenhunt and Ferguson

[57] ABSTRACT

A four-wheel steering system for a vehicle comprising a steering mechanism including a steering wheel, a front wheel turning mechanism operatively connected to the steering mechanism to turn the front wheels according to the turning angle of the steering wheel, a rear wheel turning mechanism operatively connected to the steering mechanism to turn the rear wheels in response to operation of the steering wheel, and a rear wheel steering ratio changing mechanism for changing the ratio of the turning angle of the rear wheels to the turning angle of the steering wheel.

17 Claims, 16 Drawing Figures

FOUR-WHEEL STEERING SYSTEM FOR VEHICLE

BACKGROUND OF THE INVENTION

1. Field of the Invention

This invention relates to a four-wheel steering system for a vehicle in which both the front wheels and the rear wheels are turned in response to operation of the steering wheel.

2. Description of the Prior Art

In the four-wheel steering system which is to be put into practice in the near future, it is preferred that the turning angle of the rear wheels for a given turning angle of the steering wheel be changed in steps. Thus, there is required a steering ratio changing mechanism which is disposed between the steering mechanism and the rear-wheel turning mechanism to change the ratio of the turning angle of the rear wheels to the turning angle of the steering wheel. In U.S. Pat. No. 4,313,514, there is disclosed a steering ratio changing mechanism in which a lever is utilized for changing the ratio of the turning angle of the rear wheels to the turning angle of the steering wheel. (This ratio will be referred to as the "rear wheel steering ratio", hereinbelow.) In the steering ratio changing mechanism, a pivoted lever is connected to the steering mechanism at one end and to the rear wheel turning mechanism at the other end, and the rear wheel steering ratio is changed by changing the position of the pivotal center of the pivoted lever.

However this system is disadvantageous in that since the pivoted lever must be supported both for pivotal movement and sliding movement, backlash is apt to be produced in the supporting portion, and in that it is difficult to obtain sufficient steering rigidity since the supporting portion is subjected to a counterforce the magnitude of which depends upon the lever ratio. Further, the input force imparted, in response to operation of the steering wheel, to the pivoted lever which is large in length acts as a large bending force and accordingly it becomes difficult to obtain sufficient steering rigidity.

Further, in the steering ratio changing mechanism of the patent publication, as the angle formed between the axial direction of the pivoted lever and the direction of input from the steering mechanism is reduced, the pivoted lever tends to be displaced with respect to the supporting portion, which is not preferred in view of the desire to obtain a precise steering ratio.

SUMMARY OF THE INVENTION

In view of the foregoing observations and description, the primary object of the present invention is to provide a four-wheel steering system for a vehicle in which a desired rear wheel steering ratio can be precisely obtained and the steering rigidity can be sufficiently enhanced.

In accordance with the present invention, the rear wheel steering ratio changing mechanism comprises a pivoted member which is adapted to be swung by a swinging member, the swinging plane of the pivoted member along which the pivoted member is swingable being adapted to be inclined with respect to a predetermined reference plane, the swinging member being adapted to swing the pivoted member by way of steering operating force; inclination changing means for changing the angle of inclination of the pivoted member with respect to the reference plane; and connecting means which connects an off-centered portion of the pivoted member positioned deviated from the pivotal center of the pivoted member with said rear wheel turning mechanism, whereby the turning angle of the rear wheels is controlled according to the amount of movement of the off-centered portion of the pivoted member which is determined by the swinging angle of the pivoted member through which the pivoted member is swung by the swinging member in response to operation of the steering wheel and by the angle of inclination of the pivoted member with respect to the reference plane. The swinging member is a member for causing the pivoted member to swing and the swinging member itself need not be adapted to swing.

DESCRIPTION OF THE PREFERRED EMBODIMENT

Figure 1:
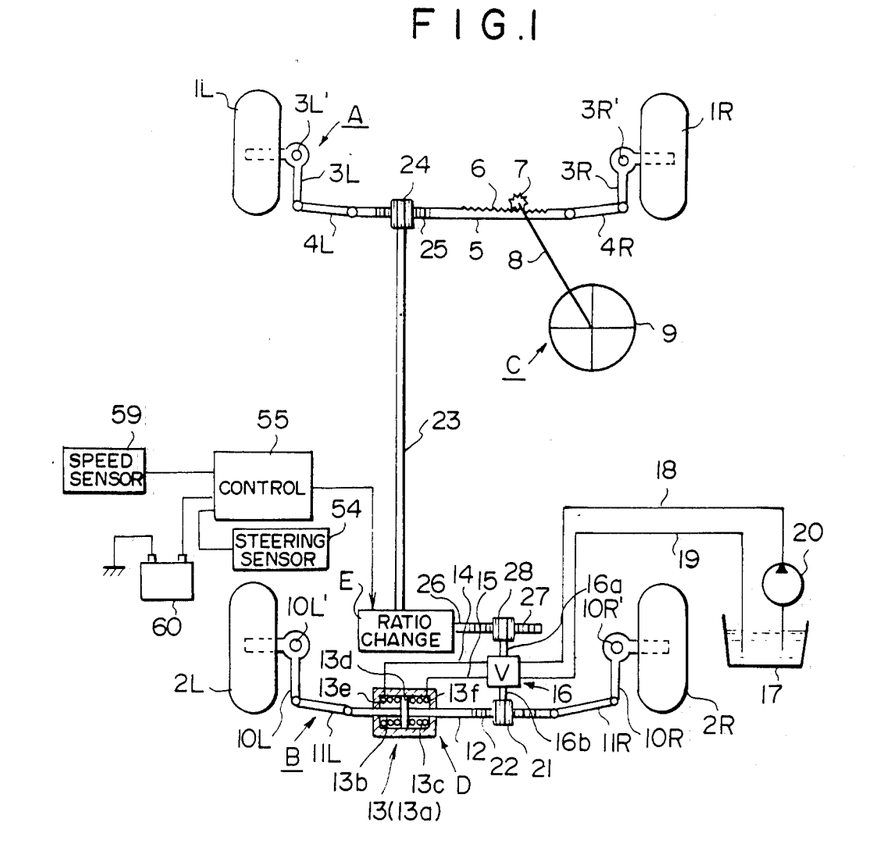
FIG. 1 is a schematic view showing a four-wheel steering system in accordance with a first embodiment of the present invention.

In FIG. 1, reference numerals 1R and 1L respectively denote right and left front wheels connected to a front wheel turning mechanism A, and reference numerals 2R and 2L respectively denote right and left rear wheels connected to a rear wheel turning mechanism B.

In the illustrated embodiment, the front wheel turning mechanism A comprises right and left knuckle arms 3R and 3L, right and left tie rods 4R and 4L, and a relay rod 5 connecting the tie rods 4R and 4L with each other. The front wheel turning mechanism A is associated with a steering mechanism C which is of a rack-and-pinion type in this particular embodiment. That is, a rack 6 is formed on the relay rod 5 and is in mesh with a pinion 7 which is fixed to a shaft 8 to be rotated in response to turning movement of a steering wheel 9. When the steering wheel 9 is turned right, the relay rod 5 is moved left in FIG. 1 to clockwisely rotate the right and left knuckle arms 3R and 3L about their respective pivotal center 3R' adn 3L', thereby turning the front wheels 1R and 1L in the clockwise direction by an amount corresponding to the turning angle of the steering wheel 9. When the steering wheel 9 is turned left, the front wheels 1R and 1L are turned in the counterclockwise direction by an amount corresponding to the turning angle of the steering wheel in a similar manner.

The rear wheel turning mechanism B comprises right and left knuckle arms 10R and 10L, right and left tie rods 11R and 11L, and a relay rod 12 connecting the tie rods 11R and 11L with each other, and is provided with a power steering mechanism D. That is, a cylinder device 13 is mounted on the relay rod 12 and a piston 13d is formed on the relay rod 12 integrally therewith. The piston 13d is inserted into a cylinder 13a to divide the internal space thereof into a pair of compartments 13b and 13c. The compartments 13b and 13c are connected to a control valve 16 by way of pipes 14 and 15, respectively. The control valve 16 is connected to a reservoir 17 by way of pipes 18 and 19. The pipe 18 which forms an oil feed line is provided with an oil pump 20 which is driven by the engine of the vehicle (not shown). The control valve 16 has an input shaft 16a which forms an input member of the power steering mechanism D, and an output shaft 16b which is connected to the input shaft 16a and forms an output member of the power steering mechanism D. A pinion 21 is mounted on the output shaft 16b and is in mesh with a rack 22 formed on the relay rod 12.

When the input shaft 16a is rotated in one direction, the pinion 21 is rotated in the same direction to move the relay rod 12 leftward, for instance, thereby clockwisely rotating the right and left knuckle arms 10R and 10L about their respective pivotal centers 10R' and 10L' to turn the rear wheels 2R and 2L right. When the rear wheels 2R and 2L are turned right, oil pressure is fed to the compartment 13c of the cylinder 13a according to the amount of rotation of the input shaft 16a to multiply the force acting to move the relay rod 12. When the input shaft 16a is rotated in the other direction, the rear wheels 2R and 2L are turned left with the force acting to move the relay rod 12 being multiplied by oil pressure fed to the compartment 13b of the cylinder 13a. Reference numerals 13e and 13f respectively denote return springs for urging the relay rod 12 toward the neutral position.

The rear wheel turning mechanism B is connected with the steering mechanism C by way of the front wheel turning mechanism A and a steering ratio changing mechanism E. An intermediate rod 23 extends forward from the steering ratio changing mechanism E and a pinion 24 is mounted on the front end of the intermediate rod 23 and is in mesh with a rack 25 formed on the relay rod 5 of the front wheel turning mechanism A. A rod-like movable member 26 extends from the steering ratio changing mechanism E and a rack 27 is formed on the rod-like movable member 26. The rack 27 is in mesh with a pinion 28 mounted on the input shaft 16a of the control valve 16.

Figure 2:
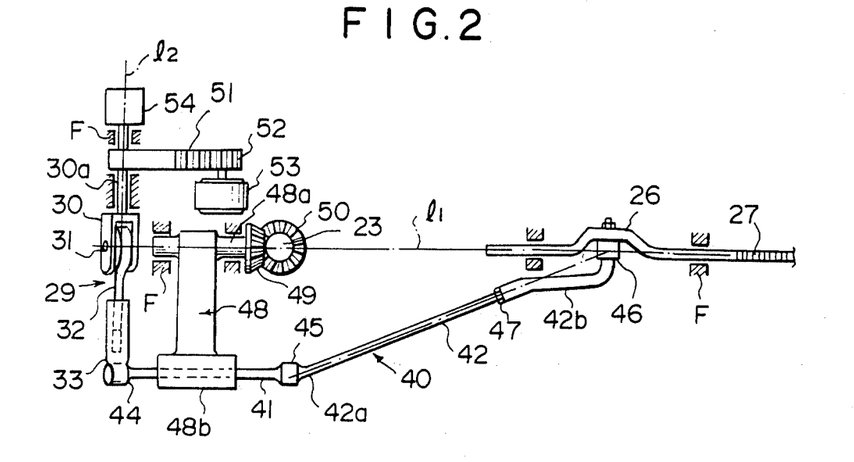
FIG. 2 is an enlarged schematic view illustrating an example of the steering ratio changing mechanism employed in the four-wheel steering system of the first embodiment.
Figure 3:
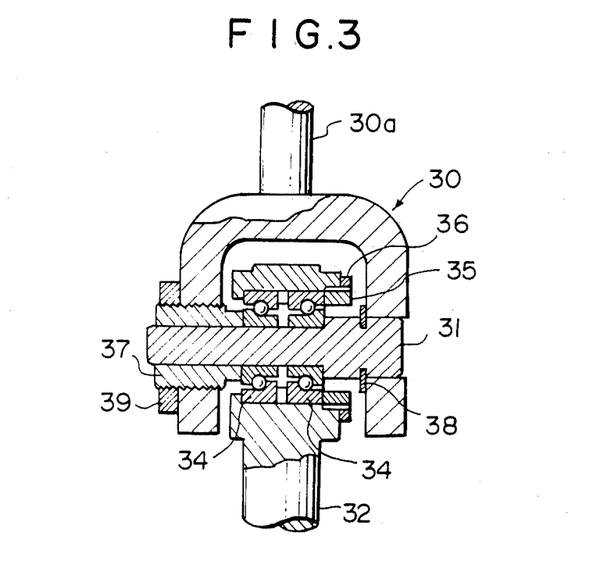
FIG. 3 is an enlarged cross-sectional view of a part of the steering ratio changing mechanism of FIG. 2.

FIGS. 2 and 3 show an example of the steering ratio changing mechanism E. Said rod-like movable member 26 is supported for sliding movement in the transverse direction of the vehicle body F along line 11 in FIG. 2. The steering ratio changing mechanism E includes a pivoted member 29 which, in this particular embodiment, comprises a first member 32 connected for pivotal movement to a holder 30 by a pin 31, and a second member 33 mounted on the free end portion of the first member 32 to be slidable with respect thereto. The holder 30 is supported on the vehicle body F so that the rotary shaft 30a thereof is rotatable about a line 12 perpendicular to the line 11 along which said movable member 26 is movable. The pin 31 extends through the intersection of the lines 11 and 12 and is perpendicular to the line 12.

As clearly shown in FIG. 3, the holder 30 is bifurcated and the pin 31 extends between the arms of the bifurcated portion. The first member 32 is mounted for pivotal movement on the pin 31 by way of a pair of angular bearings 34. The first member 32 is prevented from being drawn away from the bearings 34 by a hub 35 which is retained in place by a lock nut 36. The pin 31 is prevented from being drawn away from the holder 30 by a hub 37 and a retainer ring 38, the hub 37 being retained in place by a lock nut 39. As can be understood from the description above, the pivoted member 29 is swingable about the pin 31, and the inclination of the swinging plane of the pivoted member 29 (that is, the plane along which the pivoted member 29 is swingable) with respect to a plane perpendicular to the line 11 (This plane forms the aforesaid reference plane in this embodiment.) can be changed by rotating the holder 30.

The lower end portion of the second member 33 of the pivoted member 29 is connected with the rod-like movable member 26 by way of a connecting member 40. The connecting member 40 comprises a first arm portion 41 extending substantially in parallel to the line 11 along which the movable member 26 is slidable, and a second arm portion 42 which is inclined with respect to the line 11, and the first arm portion 41 and the second arm portion 42 are connected with each other by a ball joint 45. The first arm portion 41 is connected with the second member 33 of the pivoted member 29 by a ball joint 44 and the second arm portion 42 is connected with the movable member 26 by a ball joint 46. The second arm portion 42 is formed by first and second portions 42a and 42b, the first portion 42a being screwed on the second portion 42b, and the overall length of the second arm portion 42 is adjusted to a predetermined length by adjusting a lock nut 27. That is, the space between the ball joints 44 and 46 is adjusted to a predetermined valve by adjusting the lock nut 47. Though the second portion 42b of the second arm portion 42 is bent at the end portion adjacent to the movable member 26 in order to prevent interference therewith, the ball joint 46 connecting the second arm portion 42 with the movable member 26 is positioned on the extension of the first portion 42a which is straight.

The distance between the ball joint 46 and the ball joint 44 which is at an off-centered portion of the pivoted member 29 with respect to the pivotal center thereof, that is, which is positioned to be separated from the pivotal center of the pivoted member 29, is kept constant by the connecting member 40. Therefore, when the ball joint 44 is moved right/left in FIG. 2, the movable member 26 is moved right/left in response to the movement of the ball joint 44.

Swinging movement of the pivoted member 29 about the pin 31 is made according to the turning angle of the steering wheel 9. For this purpose, a swinging arm member 48 is provided to act on the first arm portion 41 of the connecting member 40. The swinging arm member 48 is supported for pivotal movement on the vehicle body F by a rotary shaft 48a formed on the upper end thereof so that the rotary shaft 48a extends along the line 11 along which the movable member 26 is slidable. The swinging arm member 48 is provided with a tubular portion 48b formed on the lower end portion thereof, and said first arm portion 41 of the connecting member 40 is slidably received in the tubular portion 48b and extends through the same. A bevel gear 49 is fixed to the rotary shaft 48a of the swinging arm member 48 and is in mesh with a bevel gear 50 fixed to the rear end of the intermediate rod 23. Thus, the swinging arm member 48 swings the pivoted member 29 about the pin 31 by an amount corresponding to the turning angle of the steering wheel 9. Though the movable member 26 is slid along the line 11 in response to the pivotal movement of the pivoted member 29 by way of the connecting member 40, the amount of the sliding movement of the movable member 26 for a given amount of pivotal movement of the pivoted member 29 varies depending upon the inclination of the swinging plane of the pivoted member 29 with respect to the reference plane, i.e., a plane perpendicular to the line 11. That is, the amount of the sliding movement of the movable member 26 for a given amount of pivotal movement of the pivoted member 29 can be changed by rotating the holder 30.

A sector gear 51 is fixedly mounted on the rotary shaft 30a of the holder 30 and is in mesh with a pinion 52 which is driven by an actuator 53 such as a solenoid or an electric motor. The angular position or the inclination of the swinging plane of the pivoted member 29 is detected by a steering ratio detecting sensor 54.

Figure 5:
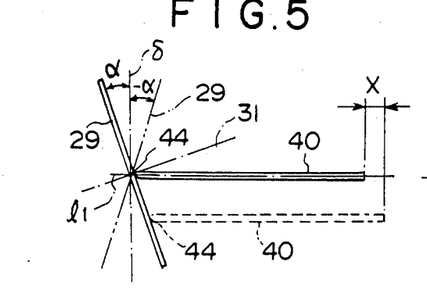
FIGS. 5 and 6 are views for illustrating the relation among the swinging angle of the pivoted member, the inclination of the swinging plane of the pivoted member and the amount of the sliding movement of the movable member.
Figure 6:
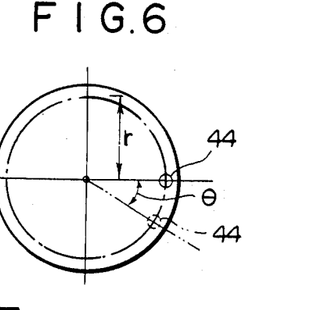

The relation among the swinging angle of the pivoted member 29 (the angle by which the pivoted member 29 is swung about the pin 31), the angular position of the pin 31 or the holder 30 (the inclination of the swinging plane of the pivoted member 29) and the amount of sliding movement of the movable member 26 or the ball joint 44 will be described with reference to FIGS. 5 and 6 in which the components such as the pivoted member 29 and the connecting member 40 are schematically shown. In FIGS. 5 and 6, when the swinging angle of the pivoted member 29 about the pin 31 is represented by $\theta$, the reference plane perpendicular to the line 11 is represented by $\delta$, the angle of inclination of the swinging plane of the pivoted member 29 with respect to the reference plane $\delta$ is represented by $\alpha$, and the distance between the ball joint 44 and the pin 31 or the distance by which the ball joint 44 is deviated from the pivotal center of the pivoted member 29 is represented by r, the amount of movement X of the ball joint 44 in the direction of the line 11 is a function of $\alpha$ and $\theta$ and is represented by the formula $X = r \cdot \tan\alpha \cdot \sin\theta$. Accordingly, when the angle $\alpha$ of inclination of the swinging plane of the pivoted member 29 is fixed, the amount of movement X of the ball joint 44 solely depends upon the swinging angle $\alpha$ of the pivoted member 29 or the turning angle of the steering wheel 9. On the other hand when the angle $\alpha$ is changed, the amount of movement X for a given turning angle of the steering wheel 9 is changed. In other words, the rear wheel steering ratio can be changed by changing the angle $\alpha$ of inclination of the swinging plane of the pivoted member 29 with respect to the reference plane $\delta$.

Figure 4:
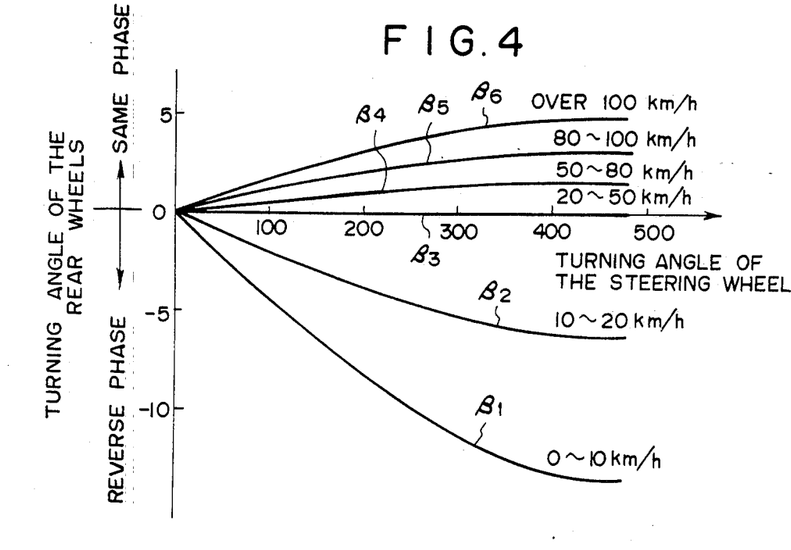
FIG. 4 is a view for illustrating an example of control to be made on the rear wheel steering ratio.

FIG. 4 shows an example of control to be made on the rear wheel steering ratio. In the example shown in FIG. 4, the rear wheel steering ratio characteristics are changed in six steps according to the vehicle speed. In the six rear wheel steering ratio characteristic curves $\beta 1$ to $\beta 6$, the characterisitic curves $\beta 1$ and $\beta 2$ represent so-called reverse phase rear wheel steering characteristics in which the rear wheels 2R and 2L are turned in the direction opposite to the front wheels 1R and 1L, and the characteristic curves $\beta 4$ to $\beta 6$ represent so-called same phase rear wheel steering characteristics in which the rear wheels 2R and 2L are turned in the same direction as the front wheels 1R and 1L. If it is assumed that the angle $\alpha$ of inclination of the swinging plane of the pivoted member 29 has a positive value in the case of the same phase rear wheel steering characteristics, it is given a negative value in the case of the reverse phase rear wheel steering characteristics.

The characteristic curve $\beta 3$ represents the case in which the rear wheels are not turned irrespective of operation of the steering wheel.

Figure 7:
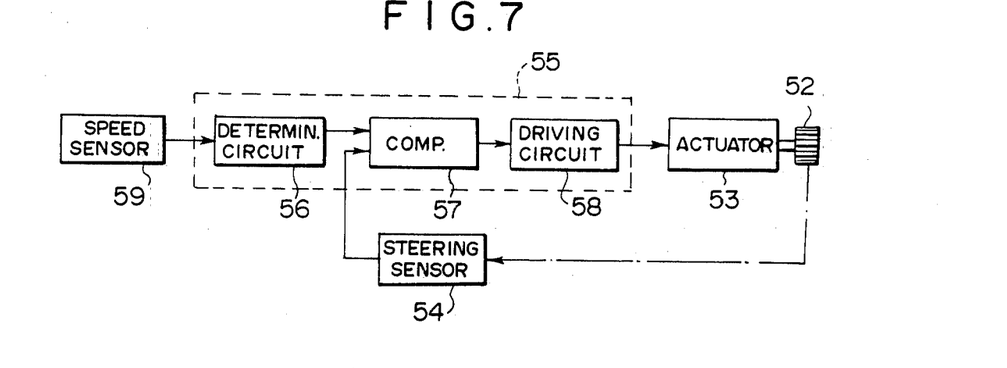
FIG. 7 is a view schematically showing the control circuit for controlling the rear wheel steering ration according to the vehicle speed.

The actuator 53 is controlled by a control circuit 55 according to the vehicle speed. As shown in FIG. 7, the control circuit 55 comprises a determination circuit 56, a comparator 57 and a driving circuit 58. A vehicle speed signal is input into the determination circuit 56 from a vehicle speed sensor 59. The signal output from the determination circuit 56 is input into the comparator 57 together with steering ratio signal from the steering ratio detecting sensor 54 which detects the actual angle $\alpha$ of inclination of the swinging plane of the pivoted member 29. The driving circuit 58 outputs to the actuator 53 according to the result of the comparison in the comparator 57. Feedback control is thus accomplished and the angle $\alpha$, and accordingly the rear wheel steering ratio, is set according to the vehicle speed. Reference numeral 60 in FIG. 1 denotes a battery.

Figure 8:
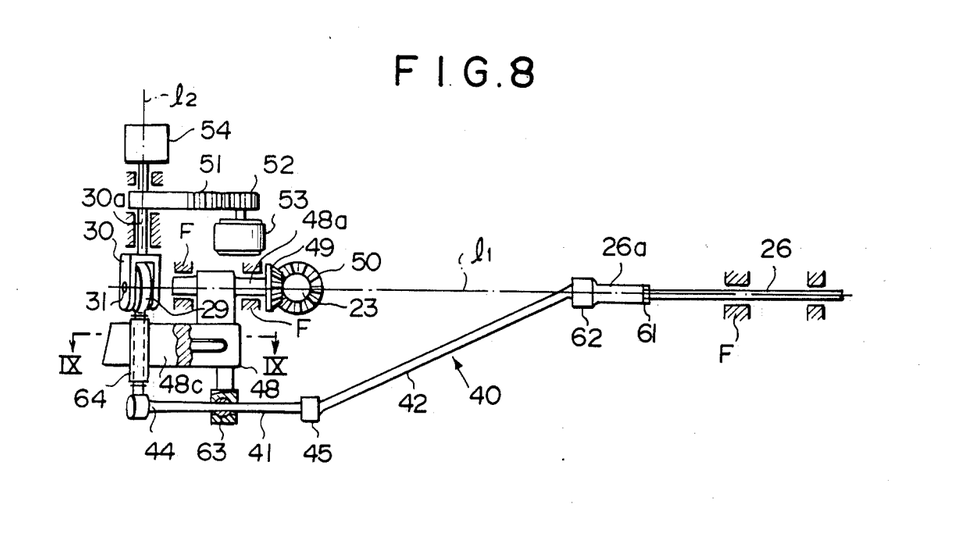
FIG. 8 is an enlarged schematic view showing the steering ratio changing mechanism employed in a four-wheel steering system in accordance with a second embodiment of the present invention.
Figure 9:
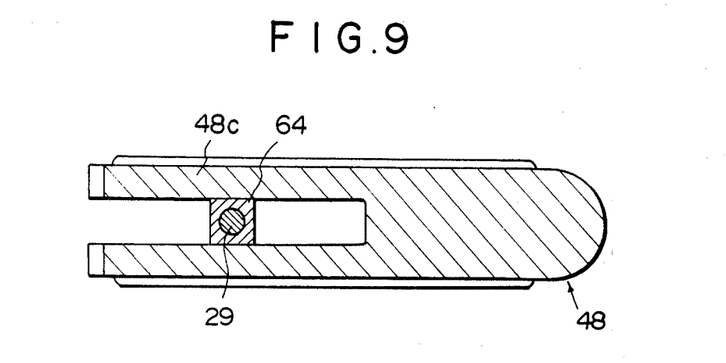
FIG. 9 is an enlarged cross-sectional view of a part of the steering ratio changing mechanism of FIG. 8.

Now a second embodiment of the present invention will be described with reference to FIGS. 8 and 9. The four-wheel steering system of this embodiment is substantially the same as the first embodiment described above except that the steering ratio changing mechanism E is somewhat different from that of the first embodiment. The steering ratio changing mechanism employed in this embodiment is nevertheless very similar to that shown in FIGS. 2 and 3. Accordingly, only the difference therebetween will be described hereinbelow. As shown in FIG. 8, the second arm portion 42 of the connecting member 40 is formed of a signle rod in the second embodiment and is connected to the movable member 26 by way of a ball joint 62 and a length adjustment member 26a which is screwed onto the movable member 26 and adapted to be retained in a desired position by means of a lock nut 61. The swinging arm member 48 is connected to the first arm portion 41 of the connecting member 40 by way of a ball joint 63 and is provided with a bifurcated portion 48c formed at an intermediate portion thereof. Into the bifurcated portion 48c is fit a hollow sliding member 64 as shown in FIG. 9 to be slidable right and left in FIGS. 8 and 9. In this embodiment, the pivoted member 29 is an intergrated member and extends through the hollow sliding member 64 to be slidable with respect thereto.

In this embodiment, as the pivoted member 29 is swung, the hollow sliding member 64 is slid right or left in the bifurcated portion 48c of the swinging arm member 48 with the first arm portion 41 being slightly swung about the ball joint 63, whereby the movable member 26 is moved right or left in FIG. 8. Also in this embodiment, the rear wheel steering ratio is changed by rotating the holder 30.

Figure 10:
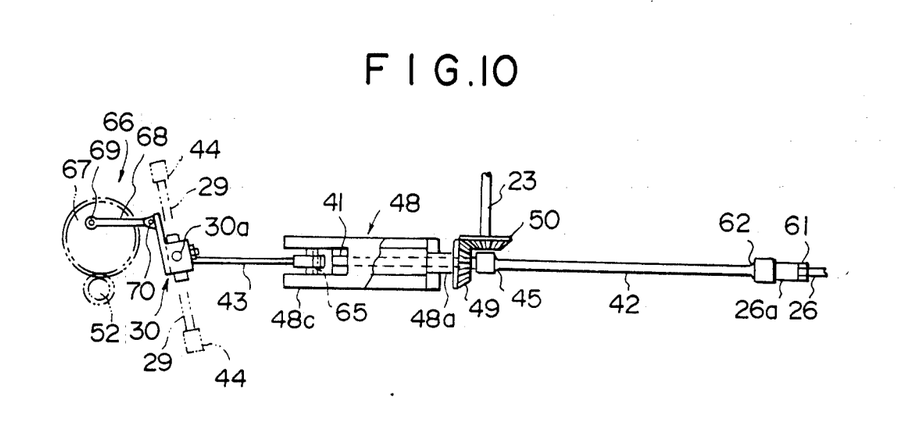
FIG. 10 is a schematic plan view showing the steering ratio changing mechanism employed in a four-wheel steering system in accordance with a third embodiment of the present invention.
Figure 11:
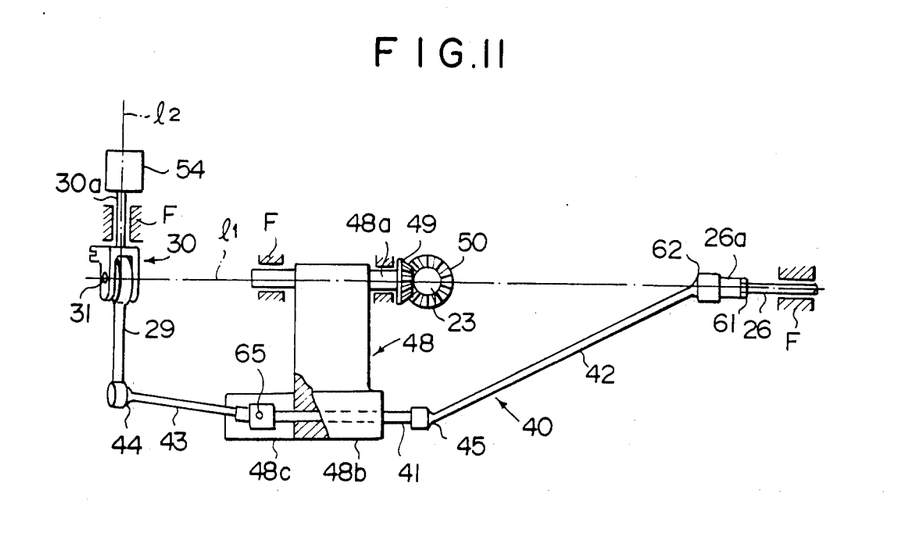
FIG. 11 is a side view of FIG. 10.

FIGS. 10 and 11 show the steering ratio changing mechanism employed in a third embodiment of the present invention. In this embodiment, the connecting member 40 has a third arm portion 43 in addition to the first and second arm portions 41 and 42. The pivoted member 29 is connected to the third arm portion 43 by way of a ball joint 44 and the third arm portion 43 is connected to the first arm portion 41 by way of a pin 65. The swinging arm member 48 has a tubular portion 48b through which the first arm portion 41 of the connecting member 40 slidably extends, and a bifurcated portion 48c having pair of arm portions between which said pin 65 extends. In this embodiment, the angular position of the holder 30 or the angle of inclination of the swinging plane of the pivoted member 29 is changed by an electric motor 53 (not shown in FIGS. 10 and 11) by way of a pinion 52 and a pivoted crank mechanism 66. That is, one end of an arm 68 is connected by a pin 69 to an off-centered portion of a gear 67 which is in mesh with the pinion 52, and the other end of the arm 68 is connected by a pin 70 to a portion of the holder 30 deviated from the pivotal center of the holder 30. (This crank mechanism is not shown in FIG. 11.)

When a step-motor is used as the actuator 53, the angle α of inclination of the swinging plane of the pivoted member 29 can be finely controlled since the step-motor can be rotated by a small angle and accordingly the rear wheel steering ratio can be controlled substantially continuously. Further the step-motor is advantageous in that holding current for holding the rear wheel steering ratio at a desired value is not necessary and electric power consumption can be reduced. Further, when a DC motor is used as the actuator 53, the overall size of the system can be reduced, and the reliability of the system can be maintained against change in temperature, vibration, voltage drop and the like. Especially, when a DC servomotor is used, the rear wheel steering ratio can be finely controlled in addition.

Figure 12:
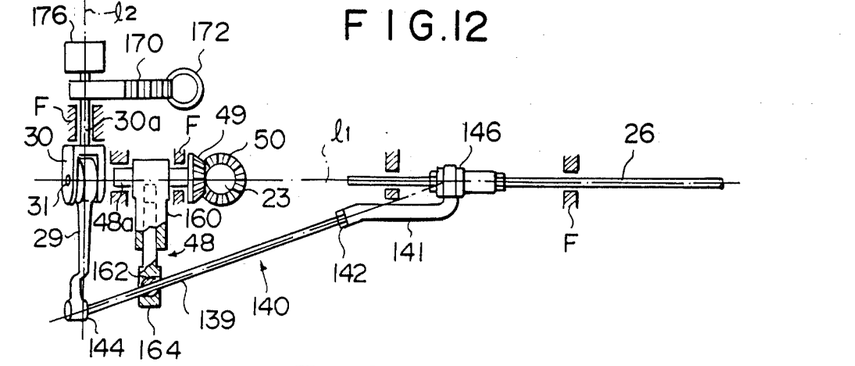
FIG. 12 is an enlarged schematic view showing the steering ratio changing mechanism employed in a four-wheel steering system employed in a fourth embodiment of the present invention.
Figure 13:
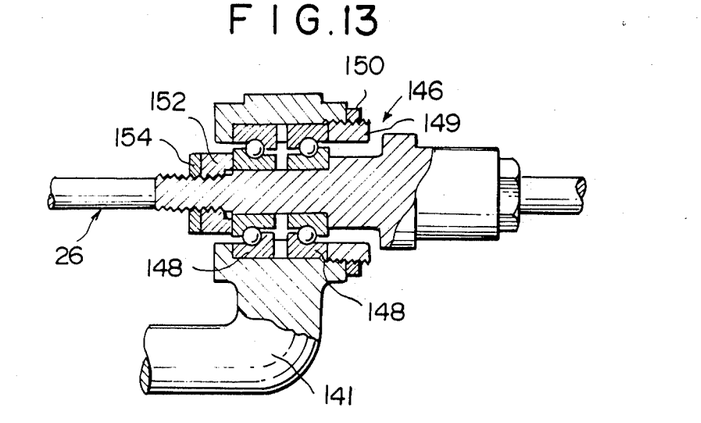
FIG. 13 is an enlarged cross-sectional view of a part of the steering ratio changing mechanism of FIG. 12.
Figure 14:
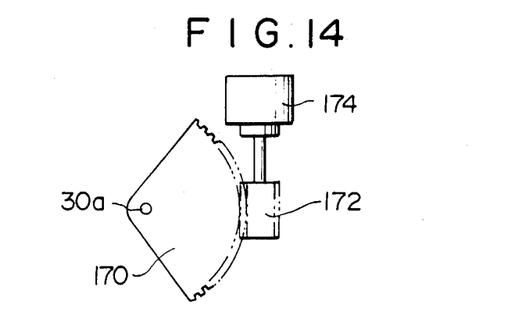
FIG. 14 is an enlarged plan view of a part of the steering ratio changing mechanism of FIG. 12.

Now a fourth embodiment of the present invention will be described with reference to FIGS. 12 to 14. The four-wheel steering system of this embodiment is substantially the same as the first embodiment described above except that the steering ratio changing mechanism E is somewhat different from that of the first embodiment. The steering ratio changing mechanism employed in this embodiment is nevertheless very similar to that shown in FIGS. 2 and 3, and accordingly only the difference therebetween will be described hereinbelow.

In this embodiment, the pivoted member 29 is an integrated member and is supported for pivotal movement by the holder 30 in the manner described above in conjunction with FIG. 2. The pivoted member 29 is connected to the movable member 26 by way of a connecting member 140 which comprises a rod 139 and an arm portion 141, and having no pivotal junction, it has high rigidity in the longitudinal direction thereof. The rod 139 is screwed on the arm portion 141 by way of a lock nut 142 so that the overall length of the connecting member 140 is adjustable. The rod 139 is connected to the pivoted member 29 by way of a ball joint 144 and the arm portion 141 is connected to the movable member 26 by way of a pivotal joint 146 which is shown in FIG. 13. As shown in FIG. 13, the arm portion 141 is connected to the movable member 26 for pivotal movement by way of a pair of angular bearings 148. The arm portion 141 is prevented from being drawn away from the bearings 148 by a hub 149 and a lock nut 150. The bearings 148 are prevented from being drawn away from the movable member 26 by a hub 152 and a lock nut 154. Though the arm portion 141 is bent at the end portion adjacent to the movable member 26 in order to prevent interference therewith, the pivotal joint 146 connecting the arm portion 141 with the movable member 26 is positioned on the extension of the rod 139 which is straight.

In this embodiment, the swinging arm member 48 for swinging the pivoted member 29 about the pin 31 according to the turning angle of the steering wheel 9 comprises a body portion 160 and a tip portion 162 slidably fit into the body portion 160. The rotary shaft 48a at which the swinging arm member 48 is supported for pivotal movement on the vehicle body F and to which the bevel gear 49 in mesh with the bevel gear 50 on the intermediate rod 23 is fixed is formed on the body portion 160. The tip portion 162 is slidable on the body portion 160 in the direction perpendicular to the rotary shaft 48a and is connected to the rod 139 of the connecting member 140 for pivotal movement by way of a ball joint 164. Since the connecting member 140 in this embodiment has no pivotal junction such as one employing a ball hoint or pin, the movement of the ball joint 144 is smoothly transmitted to the movable member 26 even if the connecting member 140 is inclined with respect to the line 11 along which the movable member 26 is slidable, whereby the steering rigidity is increased.

The means for changing the angle α of inclination of the swinging plane of the pivoted member 29 comprises, in this embodiment, a worm wheel 170 in the form of a sector gear fixedly mounted on the rotary shaft 30a of the holder 30, and a worm gear 172 which is in mesh with the worm wheel 170 and is driven by an actuator 174 such as a solenoid or an electric motor. (See FIG. 14.) The angular position of the holder 30 or the inclination of the swinging plane of the pivoted member 29 is detected by a steering ratio detecting sensor 176 which may comprise a potentiometer, for instance. Use of the worm wheel 170 and the worm gear 172 is advantageous in accomplishing fine control of the angle α of inclination of the swinging plane of the pivoted member 29, and is advantageous in that external forces such as kickback from the rear wheels 2R and 2L can be absorbed by the worm gear 172, whereby the holder 30 or the pivoted member 29 can be positively held in a desired angular position.

Figure 15:
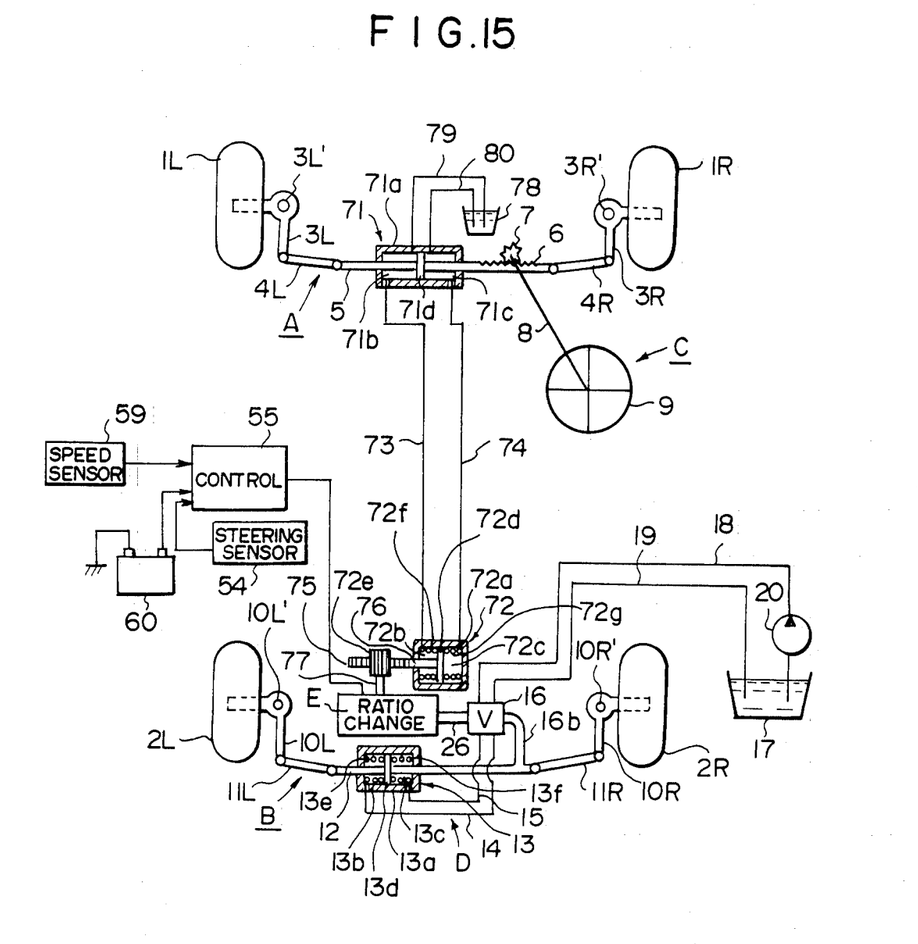
FIG. 15 is a schematic view showing a four-wheel steering system in accordance with a fifth embodiment of the present invention.

In a fifth embodiment of the present invention shown in FIG. 15, the steering mechanism C and the steering ratio changing mechanism E which are spaced from each other in the longitudinal direction of the vehicle body are operatively connected with each other by fluid pressure instead of the intermediate rod 23 employed in the preceding embodiments. That is, the relay rod 5 of the front wheel turning mechanism A is provided with a front cylinder device 71 having a cylinder 71a. A piston 71d for dividing the internal space of the cylinder 71a into first and second compartments 71b and 71c is integrally formed with the relay rod 5. Near the steering ratio changing mechanism E is provided a rear cylinder device 72 having a cylinder 72a. A piston 72d baving a piston rod 72e formed integrally therewith divides the internal space of the cylinder 72a into first and second compartments 72b and 72c. The first compartments 71b and 72b of the respective cylinders 71a and 72a are connected with each other by a pipe 73, and the second compartments 71c and 72c of the respective cylinders 71a and 72a are connected with each other by a pipe 74 so that right and left movement of the relay rod 5 of the front wheel turning mechanism A causes the piston rod 72e of the rear cylinder device 72 to move right and left in FIG. 15. The right and left movement of the piston rod 72e is transmitted to a rod 77 by way of a rack 75 formed on the piston rod 72e and a pinion 76 in mesh with the rack 75. The rod 77 is operatively connected to the swinging arm member 48 of the steering ratio changing mechanism E in the same manner as the intermediate rod 23 in FIG. 2.

In this embodiment, a booster valve type control valve haivng sliding type input and output shafts is employed as the control valve 16. Further, the movable member 26 acts also as the input member of the control valve 16. The output member 16b of the control valve 16 is formed integrally with the relay rod 12 of the rear wheel turning mechanism B. This arrangement is advantageous over the arrangement shown in FIG. 1 in that the connection of the movable member 26, the control valve 16 and the rear wheel turning mechanism B can be substantially simplified. The operation of the power steering mechanism D provided with the control valve 16 of such structure is substantially the same as that of the power steering mechanism shown in FIG. 1, and accordingly will not be described here.

Further, in the fifth embodiment shown in FIG. 15, the compartments 71b and 71c of the cylinder 71a of the front cylinder device 71 are connected to a reservoir 78 by way of pipes 79 and 80 which open to the respective compartments on opposite sides of the piston 71d near the piston 71d in its neutral position, thereby compensating for change in volume of the piping systems of the front and rear cylinder devices 71 and 72. Reference numerals 72f and 72g denote return springs for urging the piston 72d toward its neutral position.

Figure 16:
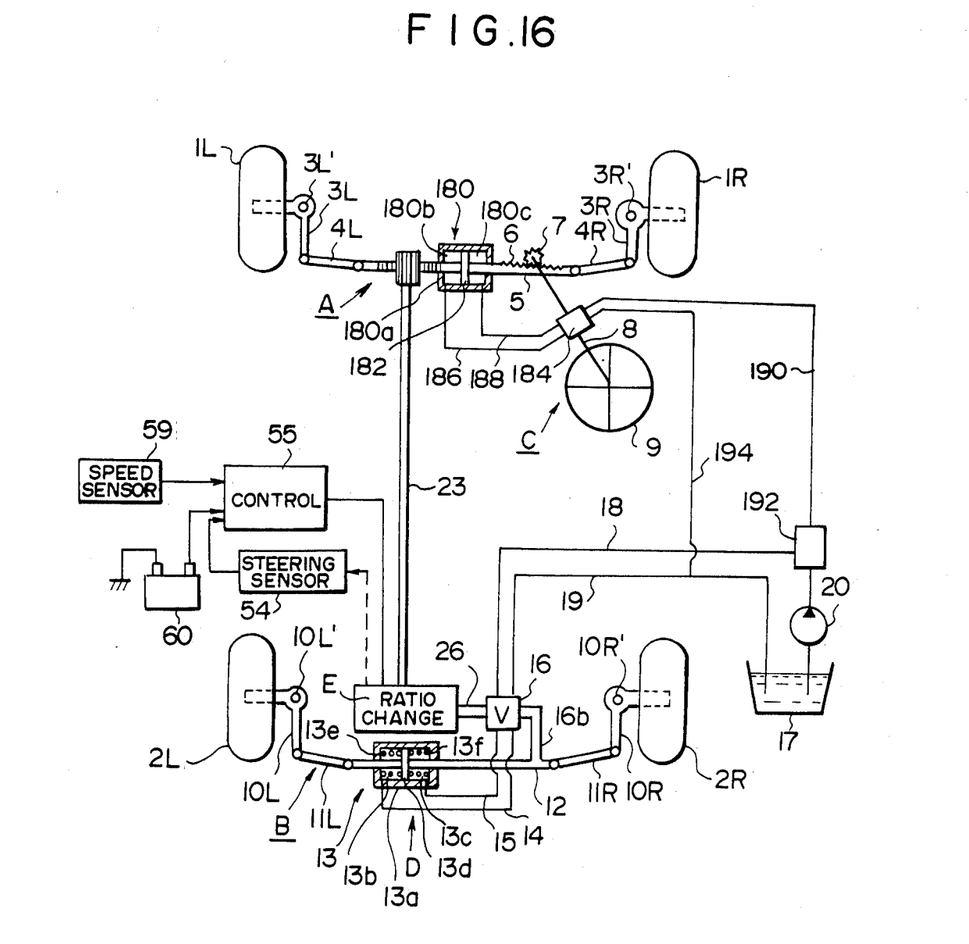
FIG. 16 is a schematic view showing a four-wheel steering system in accordance with a sixth embodiment of the present invention.

A sixth embodiment of the present invention shown in FIG. 16 is substantially the same as the fifth embodiment shown in FIG. 15 except that the steering mechanism C and the steering ratio changing mechanism E are operatively connected with each other by way of an intermediate rod as in the first embodiment instead of fluid pressure, and that also the front wheel turning mechanism A is provided with a power steering mechanism. That is, a cylinder device 180 is mounted on the relay rod 5 of the front wheel turning mechanism A and a piston 182 is formed on the relay rod 5 integrally therewith. The piston 182 divides the internal space of a cylinder 180a into compartments 180b and 180c. The compartments 180b and 180c are connected, respectively by way of pipes 186 and 188, to a control valve 184 mounted on the shaft 8 of the steering mechanism C. To the control valve 184 are connected a pipe 190 extending from a shunting valve 192 provided in the pipe 18 on the discharge side of the oil pump 20, and a pipe 194 extending from the pipe 19. The power steering mechanism of this arrangement is well known and accordingly will not be described in more detail, here.

Though in the above embodiments, the rear wheel steering ratio is changed according to the vehicle speed, the rear wheel steering ratio may be changed according to the lateral acceleration acting on the vehicle body, for instance, or according to driver's choice effected by his manual operation, may be changed according to a combination of a plurality of factors such as vehicle speed and lateral acceleration. The rear wheel turning mechanism B need not be provided with the power steering system. Further, though in the above embodiments, the steering ratio changing mechanism E is connected to the steering mechanism C by way of the front wheel turning mechanism A, it may be directly connected to the steering mechanism C. Said reference plane need not be limited to a plane perpendicular to the line 11 and other suitable planes may be used instead as the reference plane.

We claim:

1. A four-wheel steering system for a vehicle comprising a steering mechanism including a steering wheel, a front wheel turning mechanism operatively connected to the steering mechanism to turn the front wheels according to the turning angle of the steering wheel, a rear wheel turning mechanism operatively connected to the steering mechanism to turn the rear wheels in response to operation of the steering wheel, and a rear wheel steering ratio changing mechanism for changing the ratio of the turning angle of the rear wheels with respect to the turning angle of the steering wheel, characterized in that said rear wheel steering ratio changing mechanism comprises a pivoted member which is adapted to be swung by a swinging member, the swinging plane of the pivoted member along which the pivoted member is swingable being adapted to be inclined with respect to a predetermined reference plane, the swinging member being adapted to swing the pivoted member by way of steering operating force from said steering wheel; inclination changing means for changing the angle of inclination of the pivoted member with respect to the reference plane; and connecting means which connects an off-centered portion of the pivoted member positioned separated from the pivotal center of the pivoted member with said rear wheel turning mechanism, whereby the turning angle of the rear wheels is controlled according to the amount of movement of the off-centered portion of the pivoted member which is determined by the swinging angle of the pivoted member through which the pivoted member is swung by the swinging member in response to operation of the steering wheel and by the angle of inclination of the pivoted member with respect to the reference plane.

2. A four-wheel steering system as defined in claim 1 in which said rear wheel turning mechanism includes a movable member which is movable in a predetermined movable direction and is connected to said off-centered portion of the pivoted member by way of said connecting means, the turning angle of the rear wheels being controlled according to the amount of movement of the movable member in the predetermined movable direction.

3. A four-wheel steering system as defined in claim 2 in which said pivoted member is supported for pivotal movement on a supporting member which is mounted for rotation about an axis substantially perpendicular to the predetermined movable direction of the movable member.

4. A four-wheel steering system as defined in claim 3 in which said reference plane is a plane perpendicular to the predetermined movable direction of the movable member.

5. A four-wheel steering system as defined in claim 3 in which said inclination changing means comprises the supporting member and a rotating means for rotating the supporting member about the axis substantially perpendicular to the movable direction of the movable member.

6. A four-wheel steering system as defined in claim 5 in which said rear wheel turning mechanism is provided with a power-assist means which receives moving force of the movable member as an input and assists in turning the rear wheels.

7. A four-wheel steering system as defined in claim 5 in which said rotating means comprises an electric motor.

8. A four-wheel steering system as defined in claim 7 in which the driving force of the electric motor is transmitted to the supporting member by way of a worm gear unit.

9. A four-wheel steering system as defined in claim 7 in which said electric motor is controlled by a control circuit.

10. A four-wheel steering system as defined in claim 5 in which said swinging member comprises an arm member which is mounted for pivotal movement about an axis substantially parallel to said movable direction of the movable member and is adapted to be swung by an angle corresponding to the turning angle of the steering wheel, the arm member being operatively connected to said pivoted member to swing it together therewith.

11. A four-wheel steering system as defined in claim 10 in which said axis about which the arm member is swung is positioned substantially on the movable direction of the movable member.

12. A four-wheel steering system as defined in claim 10 in which said connecting means comprises a single rod member.

13. A four-wheel steering system as defined in claim 10 in which said connecting means comprises a pair of rod members.

14. A four-wheel steering system as defined in claim 10 in which said connecting means comprises three rod members.

15. A four-wheel steering system as defined in claim 10 in which said rear wheel steering ratio changing mechanism is operatively connected to the steering mechanism by way of a transmission means for transmitting moving force of a movable portion of said front wheel driving mechanism which is moved in the transverse direction of the vehicle body in response to operation of the steering wheel and said arm member is swung under the moving force of the movable portion transmitted thereto by way of the transmission means.

16. A four-wheel steering system as defined in claim 15 in which said transmission means comprises a rack formed on said movable portion of the front wheel turning mechanism, a rotary rod and a pinion fixed to one end of the rotary rod and in mesh with the rack.

17. A four-wheel steering system as defined in claim 15 in which said transmission means comprises a pair of piston/cylinder units which are respectively connected to the movable portion of the front wheel turning mechanism and the arm member and are connected with each other by pipes to transmit the moving force of the movable portion of the front wheel turning mechanism by way of fluid pressure.

* * * * *

UNITED STATES PATENT AND TRADEMARK OFFICE
CERTIFICATE OF CORRECTION

PATENT NO. : 4,572,316

DATED : February 25, 1986

INVENTOR(S) : KANAZAWA et al.

It is certified that error appears in the above-identified patent and that said Letters Patent is hereby corrected as shown below:

On the title assignee should read

-- [73] Assignees: Mazda Motor Corporation
Hiroshima, JAPAN and

Nippon Seiko Kabushiki Kaisha
Tokyo, JAPAN --.

Signed and Sealed this

Twentieth Day of January, 1987

Attest:

DONALD J. QUIGG

*Attesting Officer*　　　*Commissioner of Patents and Trademarks*